United States Patent [19]

Slack

[11] Patent Number: 4,883,909

[45] Date of Patent: Nov. 28, 1989

[54] LIQUID DIPHENYLMETANE DIISOCYANATE COMPOSITIONS

[75] Inventor: William E. Slack, Moundsville, W. Va.

[73] Assignee: Mobay Corporation, Pittsburgh, Pa.

[21] Appl. No.: 193,302

[22] Filed: May 11, 1988

[51] Int. Cl.$^4$ ............................................. C07C 119/48
[52] U.S. Cl. ..................................................... 560/351
[58] Field of Search ........................................... 560/351

[56] References Cited

U.S. PATENT DOCUMENTS

| | | | |
|---|---|---|---|
| 3,152,162 | 10/1964 | Fischer et al. | 260/453 |
| 3,384,653 | 5/1968 | Erner et al. | 260/453 |
| 3,394,165 | 7/1968 | McClellan et al. | 260/453 |
| 3,449,256 | 6/1969 | Farrissey et al. | 252/182 |
| 3,640,966 | 2/1972 | Hennig et al. | 260/77.5 |
| 3,641,093 | 2/1972 | Brooks et al. | 260/453 |
| 3,674,828 | 7/1972 | Brooks et al. | 260/453 |
| 3,701,796 | 10/1972 | Saaty et al. | 260/453 |
| 3,883,571 | 5/1975 | Allport et al. | 260/453 |
| 4,014,935 | 3/1977 | Ibbotson | 260/566 |
| 4,031,026 | 6/1977 | Ibbotson | 252/182 |
| 4,055,548 | 10/1977 | Carleton et al. | 260/77.5 |
| 4,088,665 | 5/1978 | Findeisen et al. | 260/453 |
| 4,102,833 | 7/1978 | Salisbury | 521/159 |
| 4,115,429 | 9/1978 | Reiff et al. | 260/453 |
| 4,118,411 | 10/1978 | Reiff et al. | 260/453 |
| 4,154,752 | 5/1979 | Sundermann et al. | 260/453 |
| 4,177,205 | 12/1979 | Schaaf et al. | 260/453 |
| 4,229,347 | 10/1980 | Holt et al. | 260/239 |
| 4,261,852 | 4/1981 | Carroll et al. | 528/59 |
| 4,321,333 | 3/1982 | Alberino et al. | 521/159 |
| 4,332,742 | 6/1982 | Allen | 260/453 |
| 4,490,300 | 12/1984 | Allen et al. | 260/453 |
| 4,490,301 | 12/1984 | Pantone et al. | 260/453 |
| 4,490,302 | 12/1984 | Ma et al. | 260/453 |
| 4,539,156 | 9/1985 | Dewhurst et al. | 260/453 |
| 4,539,157 | 9/1985 | Dewhurst et al. | 260/453 |
| 4,539,158 | 9/1985 | Dewhurst et al. | 260/453 |
| 4,611,083 | 9/1986 | Buethe et al. | 560/351 |
| 4,686,242 | 8/1987 | Turner et al. | 521/137 |
| 4,689,356 | 8/1987 | Peffley et al. | 521/159 |

*Primary Examiner*—Alan Siegel
*Attorney, Agent, or Firm*—Gene Harsh; Joseph C. Gil

[57] ABSTRACT

The present invention is directed to liquid, modified isocyanates prepared by reacting 4,4'-diphenylmethane diisocyanate, specific amines, and tripropylene glycol. The invention is also directed to processes for the production thereof.

7 Claims, No Drawings

LIQUID DIPHENYLMETANE DIISOCYANATE COMPOSITIONS

This invention relates to organic isocyanates based on 4,4'-diphenylmethane diisocyanates which are liquid at 25° C. This invention also relates to a process for preparing these isocyanates.

BACKGROUND OF THE INVENTION

Diisocyanates which are liquid at room temperature have numerous advantages over solid diisocyanates. Diisocyanates which are liquid at room temperature, such as toluene diisocyanate or hexamethylene diisocyanate, are, as a rule, physiologically harmful because of their high vapor pressure. For this reason, various attempts have been made to start with diisocyanates that are solid at room temperature and convert these into liquid form.

The most commercially important diisocyanates which are solid at room temperature are 4,4'-diphenylmethane diisocyanate and the 2,4'-isomer thereof, which melt at 39° C. and 34.5° C., respectively.

Numerous patents have issued relating to the liquification of diphenylmethane diisocyanate. See, for example, U.S. Pat. Nos. 3,152,162; 3,384,653; 3,394,165; 3,449,256; 3,640,966; 3,641,093; 3,674,828; 3,701,796; 3,883,571; 4,014,935; 4,055,548; 4,088,665; 4,031,026; 4,102,833; 4,115,429; 4,118,411; 4,154,752; 4,177,205; 4,229,347; 4,261,852; 4,321,333; 4,332,742; 4,490,300; 4,490,301; 4,490,302; 4,539,156; 4,539,157; and 4,539,158.

Urea group-containing polyisocyanate mixtures which are liquid at room temperature are also known. See, U.S. Pat. No. 4,611,083. Such mixtures are prepared by reacting polyoxyalkylene polyamines having functionalities of from 2 to 5 and amine numbers of from 20 to 250 with specific polyisocyanates based on diphenylmethane diisocyanate. The specific polyisocyanate used is selected from the group consisting of (i) at least one diphenylmethane diisocyanate isomer and (ii) a mixture of diphenylmethane diisocyanates and polyphenylpolymethylene polyisocyanates where the diisocyanate content of the mixture is from 55 to 90 weight percent.

It is also known that diphenylamine diisocyanates and the higher derivatives can form stable prepolymers with primary amine terminated materials having a degree of amination of from 25 to 85% and with secondary amine-terminated materials having a degree of amination of from 25 to 100%. See, U.S. Pat. No. 4,686,242.

Prepolymers are also known which are prepared by reacting amine-terminated polyethers with a variety of different isocyanates including diphenylmethane diisocyanates, See, U.S. Pat. No. 4,689,356.

It is an object of this invention to provide improved organic isocyanates which are liquid at 25° C. A further object of this invention is to provide organic isocyanates which remain liquid even on prolonged storage. Still another object of this invention is to provide an improved process for preparing liquid organic isocyanates.

DESCRIPTION OF THE INVENTION

The present invention is directed to liquid modified isocyanates prepared by reacting (i) 4,4'-diphenylmethane diisocyanate, (ii) an organic material containing two or more primary and/or secondary amine groups, said organic material forming a product which is solid at 25° C. when reacted with 4,4'-diphenylmethane diisocyanate in an amount such that the resultant solid product would have an isocyanate group content of from 10 to 30% by weight, and (iii) from 1 to 6% by weight, based on the combined weight of (i), (ii) and (iii), of tripropylene glycol. The amounts of (i), (ii) and (iii) are such that the resultant product, which is both stable and liquid at 25° C., has an isocyanate group content of from about 10 to about 27% by weight. As used herein, the term "4,4'-diphenylmethane diisocyanate" means a diisocyanate that contains at least 90% by weight of the 4,4'-isomers, with the balance being the 2,2'- and 2,4'-isomers. The tripropylene glycol may be added before, during or after the reaction of the isocyanate (i) and the organic amine group containing material (ii). The reaction of the components is generally conducted at a temperature of from about 40° C. to about 110° C., preferably between about 40° C. and about 80° C., and most preferably between about 50° and about 70° C., in a ratio such that the product has an isocyanate group content of from about 10 to about 27 percent by weight, and preferably of from about 15 to about 27 percent by weight, and most preferably from about 18 to about 25 percent by weight. The instant invention is also directed to the process for preparing the isocyanates.

The invention is also directed to the liquid product formed by heating the reaction product of the amine and the isocyanate at from about 80° to about 200° C. for from about 1 to about 90 minutes, cooling the resultant product to about 55° C., and then adding tripropylene glycol. The resultant product contains biuret groups or both biuret and allophanate groups.

Substantially, any polyamine containing two or more primary and/or secondary amine groups may be used. Preferred are those aromatic polyamines with at least one ortho position to each amine group occupied by a group (i) larger than hydrogen, and (ii) not reactive with an isocyanate group. Most preferred are polyamines prepared by hydrolyzing an isocyanate compound having an isocyanate group content of from 0.5 to 40% by weight. The most preferred polyamines are prepared by first reacting a polyether containing two to four hydroxyl groups with an excess of an aromatic polyisocyanate to form an isocyanate terminated prepolymer and then converting the isocyanate groups to amine groups by hydrolysis. Processes for the production of useful polyamines via isocyanate hydrolysis techniques are described in U.S. Pat. Nos. 4,386,218, 4,456,730, 4,472,568, 4,501,873, 4,515,923, 4,525,534, 4,540,720, 4,578,500 and 4,565,645, European Patent 0,097,299 and German Offenlegungsschrift 2,948,419, all the disclosures of which are herein incorporated by reference. Similar products are also described in U.S. Pat. Nos. 4,506,039, 4,525,590, 4,532,266 and 4,532,317 and in U.S. application Ser. Nos.: 437,641, filed Oct. 19, 1982; 778,656, filed Sept. 23, 1985; 895,629, filed Aug. 11, 1986; 908,535, filed Sept. 16, 1986, and 916,923, filed Oct. 9, 1986. In the event that a basic material is used during the hydrolysis of the amine which would act as a trimerization catalyst, and if that basic material is not removed after the hydrolysis reaction is complete, then an acidic material, such as benzoyl chloride, should be added either before or shortly after the addition of the amine to the isocyanate. The most preferred polyamines contains from 2 to 4 amine groups and have molecular weights of from 350 to 6000.

Also useful are the polyamines described in U.S. Pat. Nos. 4,611,083 and 4,686,242, the disclosures of which are herein incorporated by reference.

The liquid isocyanates prepared according to the present invention have a low viscosity and can be processed very easily, such as by casting or metering through pumps. Additionally, they have a very low vapor pressure and are, therefore, less physiologically harmful.

In general, the isocyanate content of the product of the process amounts to from about 10 to 27 percent by weight, and preferably from about 15 to about 27 percent by weight, and most preferably, from about 18 to about 25 percent by weight.

The product of the present invention can be used for many different polyaddition reactions in the lacquer and plastics industry. For example, they may be used in the production of polyurethane foams and elastomers, such as in reaction injection molding (RIM) products.

The invention is further illustrated but is not intended to be limited by the following examples in which all parts and percentages are by weight unless otherwise specified.

EXAMPLES

In the Examples which follow, the following materials were used:

ATP-A

Formed from a prepolymer that was prepared from 1 equivalent of 2,4-toluene diisocyanate and 0.5 equivalent of a polyol (made from the reaction of a 1:1 molar ratio mixture of glycerine and 1,2-propylene glycol with propylene oxide that resulted in an OH number of about 33) which upon hydrolysis gave an amino terminated polyether having an amine number of 32.8 and a functionality of 2.5.

ATP-B

Formed from a prepolymer that was prepared from 1 equivalent of 2,4-toluene diisocyanate and 0.5 equivalent of a polyol (made from the reaction of a 1:1 molar ratio mixture of glycerine and 1,2-propylene glycol with propylene oxide, that resulted in an OH number of about 50) which upon hydrolysis gave an amino terminated polyether having an amine number of 45.0 and a functionality of 2.5.

ATP-C

Formed from a prepolymer that was prepared from 1 equivalent of 2,4-toluene diisocyanate and 0.5 equivalent of a polyol (made from the reaction of glycerine with propylene oxide, that resulted in an OH number of about 32) which upon hydrolysis gave an amino terminated polyether having an amine number of 30.6 and a functionality of 3.0.

ATP-D

Formed from a prepolymer that was prepared from 1 equivalent of 2,4-toluene diisocyanate and 0.5 equivalent of a polyol (made from the reaction of glycerine with propylene oxide that resulted in an OH number of about 50) which upon hydrolysis gave an amino terminated polyether having an amine number of 46.3 and a functionality of 3.0.

ATP-E

Formed from a prepolymer that was prepared from 1 equivalent of 2,4-toluene diisocyanate and 0.5 equivalent of a polyol (made from the reaction of 1,2-propylene glycol with propylene oxide that resulted in an OH number of about 112) which upon hydrolysis gave an amino terminated polyether having an amine number of 77.2 and a functionality of 2.0.

ATP-F

Formed from a prepolymer that was prepared from 1 equivalent of 2,4-toluene diisocyanate and 0.5 equivalent of a polyol (made from the reaction of 1,2-propylene glycol with propylene oxide that resulted in an OH number of about 28) which upon hydrolysis gave an amino terminated polyether having an amine number of 25.6 and a functionality of 2.0.

ATP-G

Formed from a prepolymer that was prepared from 1 equivalent of 4,4'-diphenylmethane diisocyanate (MDI) and 0.5 equivlanet of a polyol (made from the reaction of 1,2-propylene glycol with propylene oxide that resulted in an OH number of about 28) which upon hydrolysis gave an amine terminated polyether having an amine number of 23.5 and a functionality of 2.0.

ATP-H

Jeffamine D-2000 (available from Texaco): which is a polyoxypropylene glycol containing terminal primary amino groups having an amine number of 56.0 and a functionality of 2.0.

MDI

An isocyanate containing 95% by weight of 4,4'-diphenylmethane diisocyanate with the remaining material being the 2,4'- and the 2,2'-isomers (isocyanate group content of 33.6% by weight).

TPG

Tripropylene glycol.

EXAMPLE 1

50 parts of MDI were charged to a reactor and heated to 55° C. 36.5 parts of ATP-A were then added with stirring. After one minute 0.2 parts of benzoyl chloride was added and the reaction mixture was held at between 50°-60° C. for 30 minutes. The reaction mixture was then cooled to room temperature and within 24 hours a solid product had formed having an 18.4% NCO content.

EXAMPLE 2

100 parts of MDI were charged to a reactor and heated to 55° C. 36.5 parts of ATP-A were then added with stirring. After one minute 0.2 parts of benzoyl chloride was added followed by the addition of 8.8 parts of TPG. The reaction mixture was held at between 50°-60° C. for one hour then cooled to room temperature to produce a cloudy liquid having an isocyanate content of 19.8%. After storage at room temperature for 117 days the product remained a cloudy liquid having a viscosity at 25° C. of 9920 mPas.

The following Table gives the results using ATP's B, C, D, E, F, G, and H using the identical procedure defined in Examples b 1 (when no TPG was used) and 2 (when TPG was used) above.

TABLE

| Example | ATP | MDI pbw | ATP pbw | TPG pbw | % NCO of Product |
|---------|-----|---------|---------|---------|------------------|
| 3  | B | 100   | 36.4 | —    | 24.0 |
| 4  | B | 50    | 36.4 | —    | 18.0 |
| 5  | B | 100   | 36.4 | 8.8  | 19.9 |
| 6  | C | 100   | 36.5 | —    | 24.0 |
| 7  | C | 50    | 36.5 | —    | 18.5 |
| 8  | C | 100   | 36.5 | 8.7  | 19.9 |
| 9  | D | 100   | 35.5 | —    | 24.0 |
| 10 | D | 50    | 36.5 | —    | 18.0 |
| 11 | D | 100   | 35.5 | 8.7  | 19.9 |
| 12 | E | 50    | 27.9 | —    | 19.3 |
| 13 | E | 50    | 15.2 | 4.2  | 19.8 |
| 14 | F | 200   | 146  | —    | 18.6 |
| 15 | F | 200   | 90   | 18.5 | 18.6 |
| 16 | G | 50    | 48.4 | —    | 19.9 |
| 17 | G | 50    | 18.6 | 4.4  | 20.5 |
| 18 | H | 200   | 125.9| —    | 18.9 |
| 19 | H | 203.3 | 40.7 | 15.6 | 22.4 |
| 20 | H | 175.6 | 68.5 | 15.6 | 18.4 |

| Example | Physical Appearance of Product after 24 hours at room temperature | Days at Room Temp | Product Stability Physical Appearance | Viscosity at 25° C. mPas. |
|---------|---------|-----|---------|--------|
| 3  | solid         | —   | —            | —      |
| 4  | solid         | —   | —            | —      |
| 5  | cloudy liquid | 117 | cloudy liquid| 8,180  |
| 6  | solid         | —   | —            | —      |
| 7  | solid         | —   | —            | —      |
| 8  | cloudy liquid | 117 | cloudy liquid| 18,700 |
| 9  | solid         | —   | —            | —      |
| 10 | solid         | —   | —            | —      |
| 11 | cloudy liquid | 117 | cloudy liquid| 10,600 |
| 12 | solid         | —   | —            | —      |
| 13 | cloudy liquid | 45  | cloudy liquid| 13,500 |
| 14 | solid         | —   | —            | —      |
| 15 | cloudy liquid | 59  | cloudy liquid| 4,770  |
| 16 | solid         | —   | —            | —      |
| 17 | cloudy liquid | 45  | cloudy liquid| 32,300 |
| 18 | solid         | —   | —            | —      |
| 19 | cloudy liquid | 62  | cloudy liquid| 530    |
| 20 | cloudy liquid | 62  | cloudy liquid| 2,450  |

All formulations in this Table contain 0.2 parts benzoyl chloride.

EXAMPLE 21

275 parts of MDI were charged to a reactor and heated at 55° C. 97 parts of ATP-B were then added with stirring. After one minute 0.2 parts of benzoyl chloride was added and the reaction mixture was found to have an NCO content of 23.8%. The reaction mixture was then heated to 120° C. over a five minute period. After 75 minutes at 120° C. the reaction mixture was cooled to 55° C. and found to have an NCO content of 22.7%. This material was split into three parts. One part was allowed to cool to room temperature and after 3 weeks was 20% solid. A second part was reacted with 1% by weight TPG for one hour at 55° C. and then allowed to cool to room temperature to afford a cloudy liquid having an NCO content of 22.0% and a viscosity at 25° C. of 1090 mPas. After 4 weeks at room temperature, it remained a cloudy liquid. A third part was reacted with 3% by weight TPG as above to afford a cloudy liquid having a NCO content of 20.8% and a viscosity at 25° C. of 3880 mPas. After 4 weeks at room temperature it remained a cloudy liquid.

EXAMPLE 22

256 parts of MDI were charged to a reactor and heated to 55° C. 94.7 parts of ATP-F were then added with stirring. After 1 minute 0.2 parts of benzoyl chloride was added and the reaction mixture was found to have an NCO content of 23.9%. The reaction mixture was then heated to 120° C. over a 5 minute period. After 58 minutes at 120° C. the reaction mixture was cooled to 55° C. and found to have an NCO content of 23.3%. This material was split into two parts. One part was allowed to cool to room temperature and after 1 day was 50% solid. The second part was reacted with 4% by weight TPG for 30 minutes at 55° C. and then allowed to cool to room temperature to afford a cloudy liquid having an NCO content of 20.6% and a viscosity at 25° C. of 1830 mPas. After 4 weeks at room temperature it remained a cloudy liquid.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A liquid, modified isocyanate prepared by reacting:
   (i) 4,4'-diphenylmethane diisocyanate,
   (ii) an organic material containing two or more primary and/or secondary amine groups, said organic material forming a product solid at 25° C. when reacted with 4,4'-diphenylmethane diisocyanate in an amount such that the resultant solid product would have an isocyanate group content of from 10 to 30% by weight, and
   (iii) from 1 to 6% by weight, based on the combined weight of (i), (ii), and (iii) of tripropylene glycol; said modified isocyanate having an isocyanate group content of from about 10 to about 27% by weight.

2. The modified isocyanate of claim 1 having an isocyanate group content of from about 15 to about 27% by weight.

3. The modified isocyanate of claim 2 having an isocyanate group content of from about 18 to about 25% by weight.

4. A process for preparing a liquid, modified isocyanate comprising reacting
   (i) 4,4'-diphenylmethane diisocyanate,
   (ii) an organic material containing two or more primary and/or secondary amine groups, said organic material forming a product solid at 25° C. when reacted with 4,4'-diphenylmethane diisocyanate in an amount such that the resultant solid product would have an isocyanate group content of from 10 to 30% by weight, and
   (iii) from 1 to 6% by weight, based on the combined weight of (i), (ii), and (iii) of tripropylene glycol; said modified isocyanate having an isocyanate group content of from about 10 to about 27% by weight, said process being conducted at a temperature of from about 40° to about 110° C.

5. The process of claim 4 wherein said temperature is from about 40° to about 80° C.

6. The process of claim 4 wherein said temperature is from about 50° to about 70° C.

7. A process for preparing a liquid, modified isocyanate comprising
   (A) reacting
   (i) 4,4'-diphenylmethane diisocyanate and
   (ii) an organic material containing two or more primary and/or secondary amine groups, said organic material forming a product solid at 25° C. when reacted with 4,4'-diphenylmethane diisocyanate in an amount such that the resultant solid product would have an isocyanate group content of from 10 to 30% by weight, and the reaction of component (i) and component (ii) being conducted at a temperature of from about 80° C. to about 200° C. for from about 1 to about 90 minutes,
(B) cooling the resultant product to about 55° C., and
(C) adding tripropylene glycol in an amount of from 1 to 6% by weight, based on the combined weight of (i), (ii) and the tripropylene glycol, said modified isocyanate having an isocyanate group content of from about 10 to about 27% by weight.

* * * * *